(12) United States Patent
Singh

(10) Patent No.: US 6,520,420 B1
(45) Date of Patent: Feb. 18, 2003

(54) VEHICLE ANTI-SLIP DEVICE

(76) Inventor: Rajkumar Singh, 125 15 Sutter Ave., South Ozone Park, NY (US) 11420

( * ) Notice: Subject to any disclaimer, the term of this patent is extended or adjusted under 35 U.S.C. 154(b) by 0 days.

(21) Appl. No.: 09/965,727

(22) Filed: Sep. 27, 2001

(51) Int. Cl.[7] .................................................. E01B 23/00
(52) U.S. Cl. ............................................................. 238/14
(58) Field of Search ................................. 238/10 R, 14; 152/208, 221, 222

(56) References Cited

U.S. PATENT DOCUMENTS

| | | | | |
|---|---|---|---|---|
| 2,248,537 A | * | 7/1941 | Libbey ........................ 238/14 |
| 2,619,289 A | * | 11/1952 | Plante ...................... 152/213 R |
| 3,069,090 A | * | 12/1962 | Ginsberg ..................... 238/14 |
| 3,878,988 A | * | 4/1975 | Blais .......................... 152/208 |
| 3,910,491 A | | 10/1975 | Ducharme |
| 3,997,110 A | * | 12/1976 | Aumont ....................... 238/14 |
| D255,560 S | | 6/1980 | La Pointe |
| 4,261,510 A | | 4/1981 | Andrus |
| 4,265,399 A | * | 5/1981 | Covington ................... 238/14 |
| 4,300,722 A | * | 11/1981 | Simmons ..................... 238/14 |
| 4,568,020 A | * | 2/1986 | Gallichan .................... 238/14 |
| 5,100,054 A | | 3/1992 | Fickett et al. |
| 5,862,983 A | | 1/1999 | Andrus et al. |
| 6,129,289 A | * | 10/2000 | Morin, Jr. .................... 238/14 |

* cited by examiner

Primary Examiner—Mark T. Le

(57) ABSTRACT

A vehicle anti-slip device for providing traction for a wheel positioned on a relatively slippery surface. The vehicle anti-slip device includes a frame having a first wall, a second wall, a third wall, and a fourth wall integrally coupled together such that the frame generally has a rectangular shape. The first and second walls are located opposite of each other. The frame has a top edge and a bottom edge. The bottom edge of the frame has a plurality of gripping members attached thereto.

6 Claims, 1 Drawing Sheet

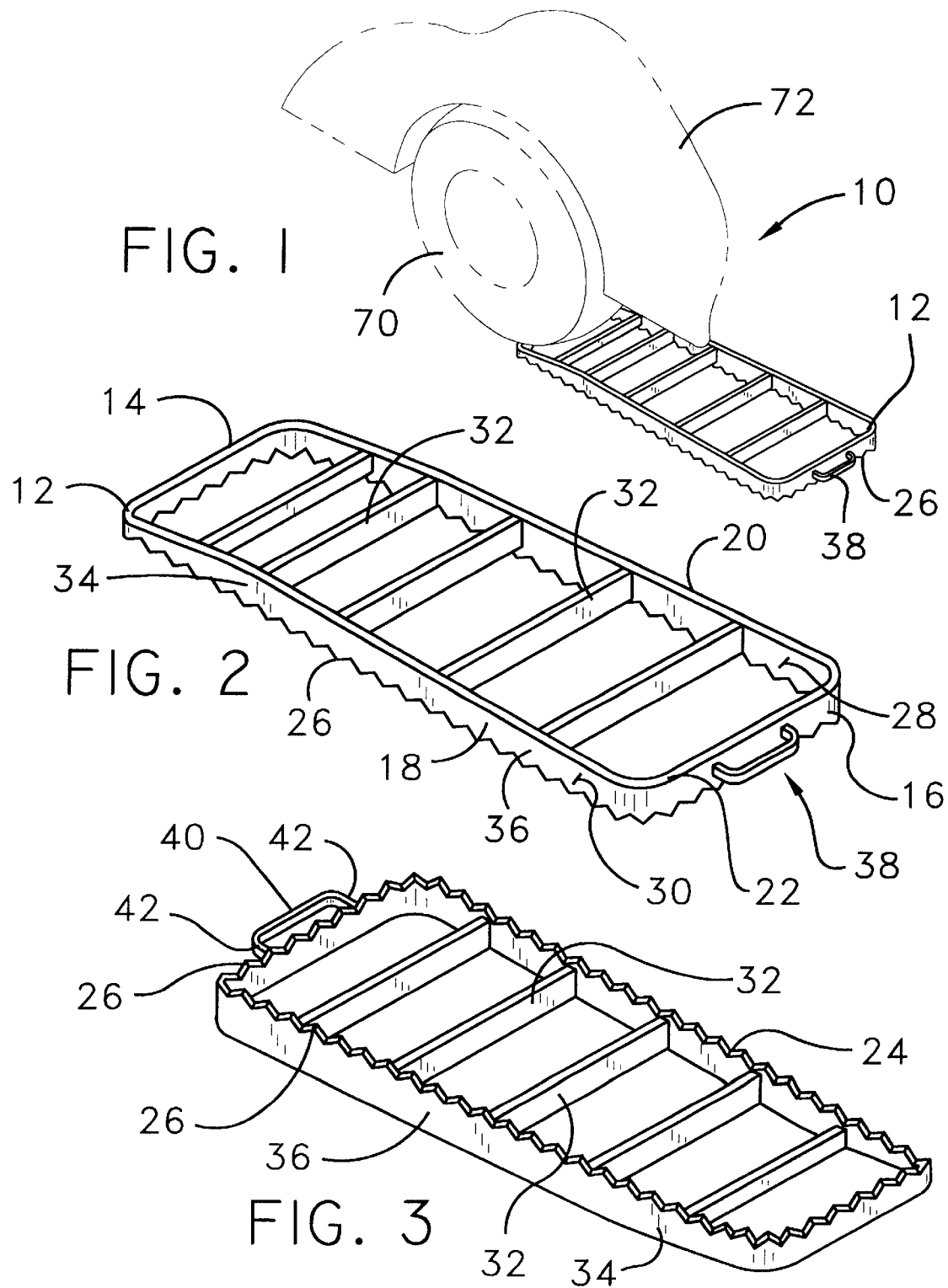

VEHICLE ANTI-SLIP DEVICE

BACKGROUND OF THE INVENTION

1. Field of the Invention

The present invention relates to traction devices for vehicle tires and more particularly pertains to a new vehicle anti-slip device for providing traction for a wheel positioned on a relatively slippery surface.

2. Description of the Prior Art

The use of traction devices for vehicle tires is known in the prior art. More specifically, traction devices for vehicle tires heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,878,988; 4,261,510; 5,100,054; 5,862,983; U.S. Pat. No. Des. 255,560; and U.S. Pat. No. 3,910,491.

While these devices fulfill their respective, particular objectives and requirements, the aforementioned patents do not disclose a new vehicle anti-slip device. The inventive device includes a frame having a first wall, a second wall, a third wall, and a fourth wall integrally coupled together such that the frame generally has a rectangular shape. The first and second walls are located opposite of each other. The frame has a top edge and a bottom edge. The bottom edge of the frame has a plurality of gripping members attached thereto.

In these respects, the vehicle anti-slip device according to the present invention substantially departs from the conventional concepts and designs of the prior art, and in so doing provides an apparatus primarily developed for the purpose of providing traction for a wheel positioned on a relatively slippery surface.

SUMMARY OF THE INVENTION

In view of the foregoing disadvantages inherent in the known types of traction devices for vehicle tires now present in the prior art, the present invention provides a new vehicle anti-slip device construction wherein the same can be utilized for providing traction for a wheel positioned on a relatively slippery surface.

The general purpose of the present invention, which will be described subsequently in greater detail, is to provide a new vehicle anti-slip device apparatus and method which has many of the advantages of the traction devices for vehicle tires mentioned heretofore and many novel features that result in a new vehicle anti-slip device which is not anticipated, rendered obvious, suggested, or even implied by any of the prior art traction devices for vehicle tires, either alone or in any combination thereof.

To attain this, the present invention generally comprises a frame having a first wall, a second wall, a third wall, and a fourth wall integrally coupled together such that the frame generally has a rectangular shape. The first and second walls are located opposite of each other. The frame has a top edge and a bottom edge. The bottom edge of the frame has a plurality of gripping members attached thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle anti-slip device apparatus and method which has many of the advantages of the traction devices for vehicle tires mentioned heretofore and many novel features that result in a new vehicle anti-slip device which is not anticipated, rendered obvious, suggested, or even implied by any of the prior art traction devices for vehicle tires, either alone or in any combination thereof.

It is another object of the present invention to provide a new vehicle anti-slip device which may be easily and efficiently manufactured and marketed.

It is a further object of the present invention to provide a new vehicle anti-slip device which is of a durable and reliable construction.

An even further object of the present invention is to provide a new vehicle anti-slip device which is susceptible of a low cost of manufacture with regard to both materials and labor, and which accordingly is then susceptible of low prices of sale to the consuming public, thereby making such vehicle anti-slip device economically available to the buying public.

Still yet another object of the present invention is to provide a new vehicle anti-slip device which provides in the apparatuses and methods of the prior art some of the advantages thereof, while simultaneously overcoming some of the disadvantages normally associated therewith.

Still another object of the present invention is to provide a new vehicle anti-slip device for providing traction for a wheel positioned on a relatively slippery surface.

Yet another object of the present invention is to provide a new vehicle anti-slip device which includes a frame having a first wall, a second wall, a third wall, and a fourth wall integrally coupled together such that the frame generally has a rectangular shape. The first and second walls are located opposite of each other. The frame has a top edge and a bottom edge. The bottom edge of the frame has a plurality of gripping members attached thereto.

Still yet another object of the present invention is to provide a new vehicle anti-slip device that is easily stored in a vehicle for placement against a wheel to provide traction when the vehicle is on an icy or otherwise slippery surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new vehicle anti-slip device according to the present invention.

FIG. 2 is a schematic perspective top view of the present invention.

FIG. 3 is a schematic perspective bottom view of the present invention.

DESCRIPTION OF THE PREFERRED EMBODIMENT

With reference now to the drawings, and in particular to FIGS. 1 through 3 thereof, a new vehicle anti-slip device embodying the principles and concepts of the present invention and generally designated by the reference numeral 10 will be described.

As best illustrated in FIGS. 1 through 3, the vehicle anti-slip device 10 generally comprises a frame 12 having a first wall 14, a second wall 16, a third wall 18, and a fourth wall 20 integrally coupled together such that the frame 12 generally has a rectangular shape. The first 14 and second 16 walls are located opposite of each other. The third 18 and fourth 20 walls are elongated with respect to the first 14 and second 16 walls. The frame 12 has a top edge 22 and a bottom edge 24. The bottom edge 24 of the frame 12 has a plurality of gripping members 26 attached thereto. The gripping members 26 preferably include a plurality of teeth. Each of the walls, or frame 12, has an inner surface 28 and an outer surface 30. A plurality of intermediate walls 32 is attached to and extends between the inner surface 28 of the third 18 and fourth 20 walls. The intermediate walls 32 are orientated generally perpendicular to the third 18 and fourth 20 walls. The intermediate walls 32 are spaced from each other. The third 18 and fourth 20 walls have a proximal portion 34 and a distal portion 36 with respect to the first wall 14. The proximal portion 34 has an increasing height from the top edge 22 to the bottom edge 24 as the proximal portions 34 extend from the first wall 14 to the distal portions 36. Ideally, the frame 12 and intermediate walls 32 are constructed of a metallic material.

A handle 38 is preferably attached to the outer surface 30 of the frame 12. The handle 38 includes a middle portion 40 and a pair of legs 42 attached to the middle portion 40 at a generally perpendicular orientation. Each of the legs 42 is attached to the outer surface 30 such that the handle 38 extends away from the frame 12. The handle 38 is preferably located on the second wall 16.

In use, the first wall 14 is placed in abutment with a tire 70 of a vehicle 72 with the teeth 26 extending downward when the tire 70 is on a slippery surface, such as ice. The tire 70 uses the device 10 for traction to remove the vehicle 72 from the slippery condition. The intermediate walls 32 give traction to the tire 70 and are used for overall strengthening of the frame 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A traction aid device for a vehicle, said device comprising:

a frame having a first wall, a second wall, a third wall, and a fourth wall integrally coupled together such that said frame generally has a rectangular shape, said first and second walls being located opposite of each other, said frame having a top edge and a bottom edge, said bottom edge of said frame having a plurality of gripping members attached thereto in a spaced linear array along an entirety of said bottom edge;

a handle being attached to an outer surface of said frame, said handle includes a middle portion and a pair of legs attached to said middle portion at a generally perpendicular orientation, each of said legs being attached to said outer surface such that said handle extends away from said frame.

2. The traction aid device as in claim 1, wherein said third and fourth walls are elongated with respect to said first and second walls, said third and fourth walls having a proximal portion and a distal portion with respect to said first wall, said proximal portion having an increasing height from said top edge to said bottom edge as said proximal portions extend from said first wall to said distal portions.

3. The traction aid device as in claim 1, wherein each of said walls has an inner surface and an outer surface, a plurality of intermediate walls being attached to and extending between said inner surface of said third and fourth walls.

4. The traction aid device as in claim 3, wherein said intermediate walls are orientated generally perpendicular to said third and fourth walls.

5. The traction aid device as in claim 4, wherein said intermediate walls are spaced from each other.

6. A traction aid device for a vehicle, said device comprising:

a frame having a first wall, a second wall, a third wall, and a fourth wall integrally coupled together such that said frame generally has a rectangular shape, said first and second walls being located opposite of each other, said third and fourth walls being elongated with respect to said first and second walls, said frame having a top edge and a bottom edge, said bottom edge of said frame having a plurality of gripping members attached thereto in a spaced linear array along an entirety of said bottom edge, said gripping members including a plurality of teeth, each of said walls having an inner surface and an outer surface, a plurality of intermediate walls being attached to and extending between said inner surface of said third and fourth walls, said intermediate walls being orientated generally perpendicular to said third and fourth walls, said intermediate walls being spaced from each other, said third and fourth walls having a proximal portion and a distal portion with respect to said first wall, said proximal portion having an increasing height from said top edge to said bottom edge as said proximal portions extend from said first wall to said distal portions; and a handle being attached to said outer surface of said frame, said handle including a middle portion and a pair of legs attached to said middle portion at a generally perpendicular orientation, each of said legs being attached to said outer surface such that said handle extends away from said frame, said handle being located on said second wall.

* * * * *